Nov. 22, 1932.     N. M. FAULDS     1,888,529
FRUIT JUICE EXTRACTOR
Filed May 5, 1931     2 Sheets-Sheet 2
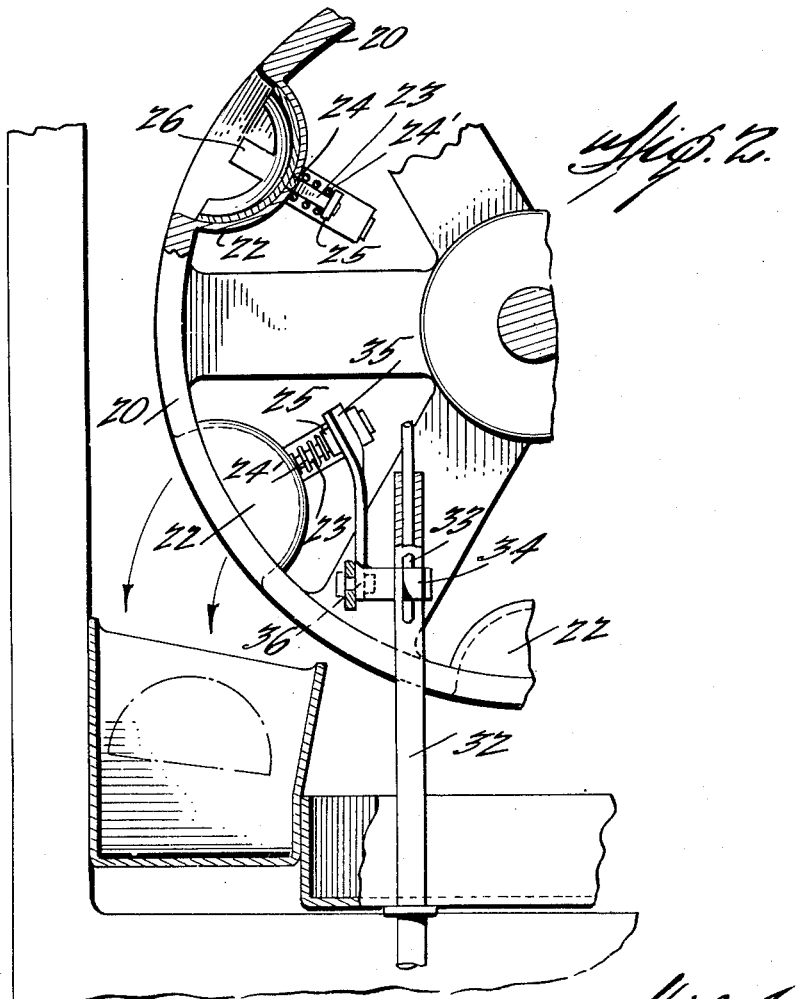
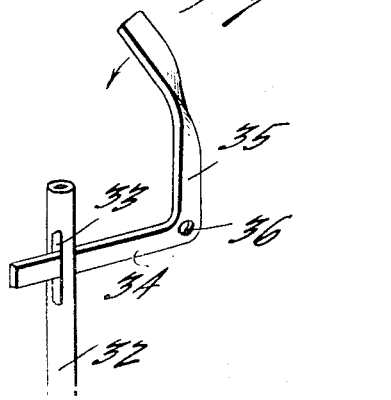
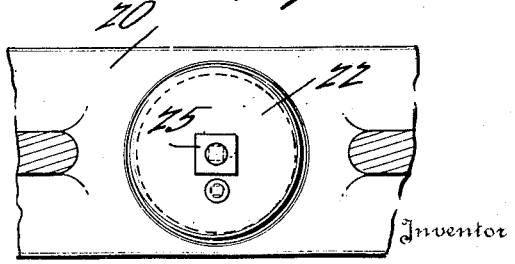

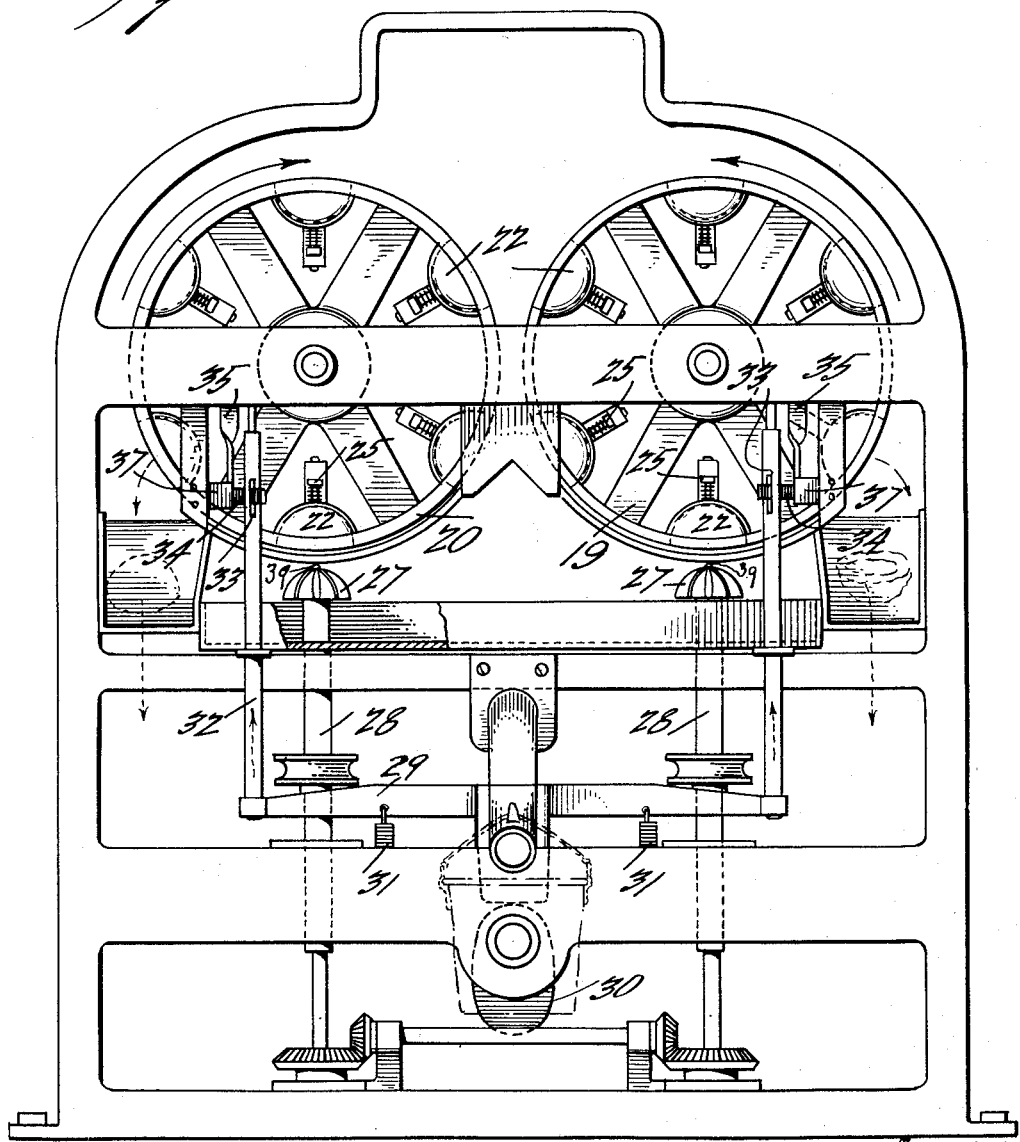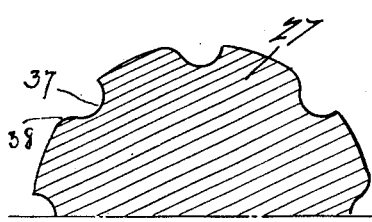

Patented Nov. 22, 1932

1,888,529

UNITED STATES PATENT OFFICE

NORVAL M. FAULDS, OF CLEARWATER, FLORIDA

FRUIT JUICE EXTRACTOR

Application filed May 5, 1931. Serial No. 535,211.

This invention relates to fruit juice extractors, and is particularly applicable to removing juice from citrus fruits.

It is an object of the invention to provide novel means for displacing peels from the carrier or cup in which the halves or parts of the fruit are carried while the juice is being removed, it having been found in practice that where cups are employed in conjunction with reamers or burrs which remove the juice from the peels, the said peels are rather securely lodged in the cups and therefore the cups are preferably provided with ejectors which displace the peels.

It is therefore an object of this invention to provide means for operating the ejectors in order that the peel will be positively dislodged from the cups prior to their arriving at a location where they receive fruit from which the juice is to be extracted.

The invention in its present embodiment is associated with a juice extracting machine forming the subject matter of my application, Serial No. 475,112, filed August 13, 1930.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in side elevation, partly in section, of a juice extracting machine embodying the invention;

Figure 2 illustrates an enlarged detail view of a fragment of the wheel and the extractor associated therewith;

Figure 3 illustrates a perspective view of the ejector operating device;

Figure 4 illustrates a sectional view through one of the wheels, showing the inner face of the cup;

Figure 5 illustrates a sectional view of the juice extracting cone or burr.

The invention is associated with operating means of a juice extractor and, in the present embodiment of the invention, it is intended to employ suitably mounted wheels 19 and 20 arranged in pairs, provided with suitable means (not shown), for rotating them in opposite directions, as indicated by the arrows.

Each wheel has a plurality of peripheral cups or seats 22 larger than one-half of any of the fruit which the wheels are intended to carry, and each cup is provided with a fruit holder or grasping element comprising a rod 23 which is slidably mounted radially of the wheel. The rod is preferably square and movable radially in a square aperture 24 in order that it will be prevented from rotating while moving radially of the wheel. Each rod is normally projected toward the periphery of the wheel by a spring 24' which encircles a portion of the rod and bears against the shoulder 25 on the rod and the fingers 26 which are carried by the rod. The fingers are preferably resilient and they are curved to engage the outer surface of the fruit which is delivered to the cup in which the fingers are seated. Fruit extracting burrs 27 are mounted on a shaft 28 and rotated by suitable means. The burrs are moved upwardly into engagement with fruit in the cups when the cups reach predetermined positions and, to that end, a bar 29 is provided which is moved upwardly by a suitably rotated cam 30, the said bar being held in engagement with the cam by springs 31. The specific means for imparting movement to the bar need not, it is thought, be set forth, in view of the fact that it does not form a part of the present invention, but the specific means for imparting such movement to a bar having practically the same function is disclosed in the aforesaid application and it forms no part of the present invention, except as the bar is relied upon for operating the peel ejector.

A rod 32 extends upwardly from each end of the bar 29 and, in the present embodiment of the invention, each rod has a slot 33 in which an arm 34 of a bell crank lever projects, the other arm 35 of the bell crank lever having a camming surface which is in position to engage the outer end of a rod 23 as the rod 32 is reciprocated. The bell crank lever is oscillatable on a pivot 36 of a bracket 37 suspended from the frame of the machine and hence, as the bell crank lever is oscillated on the pivot, it causes the rod 23 to move inwardly, carrying the fingers outwardly to a degree which will cause a dislodgment of the peel from the cup. As the cups are successively brought into the zone of action of the bell crank lever, the mechanism is operated to actuate the extractor and this is true with respect to the cups of both wheels, for it is shown that the parts described for ejecting the peel are duplicated on each side of the machine and one of which is associated with each of the wheels and the cups as they successively come into the zone of action of the said ejector.

The burr 27 is constructed to prevent the dislodgement of pulp and so-called "rag." It is intended to effect a pressing action, whereby the juice is forced out without, as stated, appreciably tearing the fibre structure of the fruit. To the end just stated, the burr has a plurality of peripheral grooves 37, the walls of which merge with the surface of the burr on a curve, as indicated at 38, it being intended that in rotating the burr, the curved edge shall be the advancing edge of the groove so that the said pressing action will result. The grooves tend to create a vacuum or suction which causes the juice to flow more freely and results in the collecting of more clear juice than burrs of known construction.

In order to limit the degree of movement into the fruit being pressed, each burr has a lug or projection 39 at the top which in depth is substantially equal to the thickness of the skin of the fruit being treated and it is the intention of the inventor that the outer end of this lug shall encounter the inner wall of the cup or that part therein carrying the fingers, a relation of parts which will prevent the burr from treating the fibrous portion of the fruit skin.

I claim:

1. In a fruit juice extractor, a rotatably mounted wheel, cups at the periphery thereof, peel ejectors in the cups, an element connected to each peel ejector projecting inwardly through the cup, a bell crank lever, one arm of which successively engages the ends of the elements for dislodging peel, means for oscillatably mounting the bell crank lever, a cam formed on the end of the arm of the lever adapted to engage the elements, and means engaging the other arm of the bell crank lever for oscillating said lever.

2. In a fruit juice extractor, a rotatably mounted wheel, cups at the periphery thereof, peel ejectors in the cups, an element connected to each peel ejector projecting inwardly through the cup, a bell crank lever, one arm of which successively engages the ends of the elements for dislodging peel, means for oscillatably mounting the bell crank lever, a cam formed on the end of the arm of the lever adapted to engage the elements, and means operated simultaneously with other parts of the juice extractor for oscillating said bell crank lever.

3. In a fruit juice extractor, a rotatably mounted wheel, cups at the periphery thereof, peel ejectors in the cups, a suitably driven burr coacting successively with the cups for extracting juice from fruit carried by the cups, an element connected to each peel ejector projecting inwardly through the cups, a bell crank lever, one arm of which successively engages the ends of the elements for dislodging peel, means for oscillatably mounting the bell crank lever, a cam formed on the end of the arm of the lever adapted to engage the elements, and means operated simultaneously with the burr for oscillating said bell crank lever.

NORVAL M. FAULDS.